United States Patent
Zhao et al.

(10) Patent No.: US 10,884,443 B2
(45) Date of Patent: Jan. 5, 2021

(54) VOLTAGE CONTROL CIRCUIT AND METHOD, PANEL AND DISPLAY APPARATUS

(71) Applicants: BOE TECHNOLOGY GROUP CO., LTD., Beijing (CN); ORDOS YUANSHENG OPTOELECTRONICS CO., LTD., Inner Mongolia (CN)

(72) Inventors: Jing Zhao, Beijing (CN); Jigang Sun, Beijing (CN); Shuang Zhao, Beijing (CN); Wei Sun, Beijing (CN)

(73) Assignees: BOE TECHNOLOGY GROUP CO., LTD., Beijing (CN); ORDOS YUANSHENG OPTOELECTRONICS CO., LTD., Inner Mongolia (CN)

( * ) Notice: Subject to any disclaimer, the term of this patent is extended or adjusted under 35 U.S.C. 154(b) by 24 days.

(21) Appl. No.: 16/176,369

(22) Filed: Oct. 31, 2018

(65) Prior Publication Data
US 2019/0179353 A1    Jun. 13, 2019

(30) Foreign Application Priority Data
Dec. 12, 2017    (CN) .......................... 2017 1 1323259

(51) Int. Cl.
*G06F 3/043*    (2006.01)
*G05F 1/59*     (2006.01)
(Continued)

(52) U.S. Cl.
CPC ................ *G05F 1/59* (2013.01); *G05F 1/461* (2013.01); *G06F 3/0412* (2013.01);
(Continued)

(58) Field of Classification Search
USPC .......................... 345/212, 173, 174; 324/679
See application file for complete search history.

(56) References Cited

U.S. PATENT DOCUMENTS 7,675,356 B2    3/2010    Kim
9,542,913 B2    1/2017    Wang
(Continued)

FOREIGN PATENT DOCUMENTS

CN    101106364 A    1/2008
CN    104050942 A    9/2014
(Continued)

OTHER PUBLICATIONS

First Office Action dated Jul. 9, 2019; Corresponding to Chinese Application No. 201711323259.X; English Translation Attached.

*Primary Examiner* — Thuy N Pardo
(74) *Attorney, Agent, or Firm* — Nath, Goldberg & Meyer; Joshua B. Goldberg

(57) ABSTRACT

The present application provides a voltage control circuit and method, a panel and a display apparatus. The voltage control circuit includes: a comparison circuit configured to compare a first voltage with a second voltage, output a first signal in a case where a difference between the first voltage and the second voltage exceeds a thresholds range, and output a second signal in a case where the difference between the first voltage and the second voltage is within the thresholds range; a compensation circuit coupled to the comparison circuit, and configured to compensate the first voltage in response to the first signal output by the comparison circuit; and a latch circuit coupled to the comparison circuit and the compensation circuit, and configured to latch the first voltage in response to the second signal output by the comparison circuit.

14 Claims, 3 Drawing Sheets

(51) Int. Cl.
  *G06F 3/041* (2006.01)
  *G05F 1/46* (2006.01)
  *G06F 3/044* (2006.01)
(52) U.S. Cl.
  CPC .......... *G06F 3/0416* (2013.01); *G06F 3/0418* (2013.01); *G06F 3/044* (2013.01)

(56) References Cited

U.S. PATENT DOCUMENTS

| | | | |
|---|---|---|---|
| 9,876,431 B2 | 1/2018 | Li | |
| 2010/0097343 A1* | 4/2010 | Fang | G06F 3/0416 345/174 |
| 2010/0265241 A1* | 10/2010 | Tahata | G09G 3/20 345/212 |
| 2011/0001714 A1* | 1/2011 | Sasaki | G06F 3/0412 345/173 |
| 2011/0115707 A1* | 5/2011 | Zhang | G06F 3/018 345/163 |
| 2011/0199105 A1* | 8/2011 | Otagaki | G06F 3/0418 324/679 |
| 2014/0104262 A1* | 4/2014 | Miyake | G09G 3/3614 345/212 |
| 2015/0002425 A1* | 1/2015 | Lee | G06F 3/046 345/173 |
| 2015/0205415 A1* | 7/2015 | Nam | G06F 3/044 345/174 |
| 2016/0070388 A1* | 3/2016 | Yoshikawa | G06F 3/0418 345/174 |
| 2017/0148390 A1* | 5/2017 | Park | G06F 1/3296 345/173 |
| 2017/0373889 A1* | 12/2017 | Sakai | H04L 25/03057 345/174 |
| 2018/0231997 A1* | 8/2018 | Stanzione | G05F 1/468 345/174 |

FOREIGN PATENT DOCUMENTS

| | | |
|---|---|---|
| CN | 104700768 A | 6/2015 |
| CN | 204407869 U | 6/2015 |
| CN | 105471263 A | 4/2016 |

* cited by examiner

VOLTAGE CONTROL CIRCUIT AND METHOD, PANEL AND DISPLAY APPARATUS

CROSS-REFERENCE TO RELATED APPLICATION

This application claims the benefit of priority to Chinese Patent Application No. 201711323259.X filed on Dec. 12, 2017, the contents of which are incorporated herein in their entirety by reference.

TECHNICAL FIELD

The present disclosure relates to the field of signal control technology, and particularly relates to a voltage control circuit, a voltage control method, a panel, and a display apparatus.

BACKGROUND

Currently, signal transmission is generally achieved by directly connecting a signal input terminal to a target component to provide a corresponding signal. For example, for a TDDI (Touch and Display Driver Integration) product, it is desirable that an actual charging voltage applied to each column of touch electrode blocks on a panel is the same so that the amount of charges stored in each column of touch electrode blocks is the same.

SUMMARY

Embodiments of the present disclosure provide a voltage control circuit, a voltage control method, a panel and a display apparatus.

In one aspect, embodiments of the present disclosure provide a voltage control circuit, including: a comparison circuit, configured to compare a first voltage with a second voltage, output a first signal in a case where a difference between the first voltage and the second voltage exceeds a thresholds range, and output a second signal in a case where the difference between the first voltage and the second voltage is within the thresholds range; a compensation circuit, coupled to the comparison circuit, and configured to compensate the first voltage in response to the first signal output by the comparison circuit; and a latch circuit, coupled to the comparison circuit and the compensation circuit, and configured to latch the first voltage in response to the second signal output by the comparison circuit.

Optionally, the comparison circuit includes a first input terminal configured to input the first voltage and a second input terminal configured to input the second voltage; an input terminal of the compensation circuit is coupled to an output terminal of the comparison circuit, and an output terminal of the compensation circuit is coupled to the first input terminal; and the latch circuit includes a third input terminal coupled to the first input terminal and a fourth input terminal coupled to the output terminal of the comparison circuit.

Optionally, the comparison circuit includes a comparator.

Optionally, the compensation circuit includes a first switch circuit and a compensation component; the first switch circuit is coupled to the output terminal of the comparison circuit and configured to trigger the compensation component to compensate the first voltage in response to the first signal output by the comparison circuit.

Optionally, the first switch circuit includes a first switch transistor, a control electrode of the first switch transistor is coupled to the output terminal of the comparison circuit, a first electrode of the first switch transistor is coupled to the compensation component, and a second electrode of the first switch transistor is grounded.

Optionally, the compensation component includes a counting circuit, a voltage dividing circuit and a compensation sub-circuit; the counting circuit is coupled to the first switch circuit, and the first switch circuit is configured to trigger the counting circuit to count a number of times of compensation in response to the first signal output by the comparison circuit; the voltage dividing circuit is coupled to the counting circuit, and configured to output a corresponding compensation voltage according to the number of times of compensation; and the compensation sub-circuit is respectively coupled to an output terminal of the voltage dividing circuit, the first input terminal of the comparison circuit, and the third input terminal of the latch circuit, and configured to compensate the first voltage based on the compensation voltage output by the voltage dividing circuit.

Optionally, the compensation sub-circuit includes a subtractor; a positive input terminal of the subtractor is configured to input the first voltage, a negative input terminal of the subtractor is coupled to the output terminal of the voltage dividing circuit, and an output terminal of the subtractor is coupled to the first input terminal of the comparison circuit and third input terminal of the latch circuit.

Optionally, the voltage dividing circuit includes a voltage divider; the voltage divider includes a plurality of switches, and is configured to turn on a corresponding switch according to the number of times of compensation, and output a corresponding compensation voltage.

Optionally, the latch circuit includes: an inverter circuit, a second switch circuit, and a latch sub-circuit; the inverter circuit is coupled to the output terminal of the comparison circuit and the second switch circuit, and is configured to invert a signal output from the output terminal of the comparison circuit; the second switch circuit is further coupled to the first input terminal of the comparison circuit and the latch sub-circuit, and the inverter circuit is configured to control the second switch circuit to provide the first voltage to the latch sub-circuit in response to the second signal output by the comparison circuit; and the latch sub-circuit is configured to latch the first voltage provided through the second switch circuit.

Optionally, the second switch circuit includes a second switch transistor; a control electrode of the second switch transistor is coupled to an output terminal of the inverter circuit, a first electrode of the second switch transistor is coupled to the latch sub-circuit, and a second electrode of the second switch transistor is coupled to the first input terminal of the comparison circuit.

Optionally, the latch sub-circuit includes: an analog-to-digital conversion circuit, a digital-to-analog conversion circuit, and a plurality of flip-flops; the second switch circuit is coupled to the analog-to-digital conversion circuit; the analog-to-digital conversion circuit is further coupled to the plurality of flip-flops and configured to perform analog-to-digital conversion on the first voltage provided through the second switch circuit; the plurality of flip-flops are further coupled to the digital-to-analog conversion circuit, and configured to latch the first voltage subjected to the analog-to-digital conversion; and the digital-to-analog conversion circuit is configured to perform digital-to-analog conversion on the latched first voltage, and output the first voltage subjected to the digital-to-analog conversion.

In another aspect, embodiments of the present disclosure provide a panel, including: N columns of electrodes and the voltage control circuit according to the embodiments of the present disclosure; the voltage control circuit is coupled to a voltage input terminal of an i-th column of electrodes of the N columns of electrodes, where i is a positive integer, and i≤N Optionally, the electrode is one of a touch electrode and a pixel electrode.

Optionally, the second voltage is an input charging voltage of a K-th column of electrodes, $$K = \left[\frac{N}{2}\right].$$

In another aspect, embodiments of the present disclosure provide a display apparatus, including the panel according to embodiments of the present disclosure.

In another aspect, embodiments of the present disclosure provide a voltage control method, including: comparing a first voltage with a reference voltage, generating a first signal in a case where a difference between the first voltage and the reference voltage exceeds a thresholds range, and generating a second signal in a case where the difference between the first voltage and the reference voltage is within the thresholds range; compensating the first voltage in response to the first signal; and latching the first voltage in response to the second signal.

Optionally, compensating the first voltage in response to the first signal includes: counting a number of times of compensation in response to the first signal; outputting a corresponding compensation voltage according to the number of times of compensation; and compensating the first voltage according to the compensation voltage.

Optionally, the voltage control method is used for sequentially controlling input charging voltages of a plurality of columns of electrodes, and the voltage control method includes: for each column of electrodes among the plurality of columns of electrodes, repeating the comparing, compensating and latching steps by taking the input charging voltage of the column of electrodes as the first voltage, until the first voltage is latched; and inputting the latched first voltage to the column of electrodes.

Optionally, the reference voltage is an input charging voltage of a K-th column of electrodes; and $$K = \left[\frac{N}{2}\right],$$

where N is a number of columns of the plurality of columns of electrodes.

Optionally, latching the first voltage in response to the second signal includes: performing analog-to-digital conversion on the first voltage in response to the second signal; latching the first voltage subjected to the analog-to-digital conversion; and performing digital-to-analog conversion on the latched first voltage and outputting the first voltage subjected to the digital-to-analog conversion.

Other features and advantages of the present disclosure will be set forth in the following embodiments in the description, and partially apparent from the following embodiments in the description, or understood by implementing the present disclosure. The objects and other advantages of the embodiments of the present disclosure can be realized and obtained by the structures particularly pointed out in the description, claims and drawings.

BRIEF DESCRIPTION OF THE DRAWINGS

The accompanying drawings, which serve to provide a further understanding of the present disclosure and constitute a part of this specification, are used for explaining the present disclosure together with the embodiments of the present disclosure, rather than limiting the present disclosure.

DETAILED DESCRIPTION

In order to make objects, technical solutions and advantages of the present disclosure more clearly, the embodiments of the present disclosure will be described in detail below with reference to the accompanying drawings. It should be noted that the embodiments in the present disclosure and the features in the embodiments may be arbitrarily combined with each other without conflict.

Unless otherwise defined, technical terms or scientific terms used in the embodiments of the present disclosure have the ordinary meanings understood by a person skilled in the art to which the present disclosure belongs. The terms "first", "second" and similar terms used in the embodiments of the present disclosure do not indicate any order, quantity, or importance, but are merely used to distinguish different components. The word "comprising", "including" or the like means that the element(s) or item(s) preceding the word encompasses the element(s), item(s) or equivalents thereof that are listed after the word, and does not exclude other element or item. The word "connected", "coupled" or the like is not limited to physical or mechanical connection, but may include electrical connection, whether direct or indirect.

Applicants have discovered that in the process of transmitting a signal to a target component, the actual signal received by the target component is inconsistent with the input signal due to differences in trace loading, parasitic capacitance and the like. For example, for a touch panel, different charging voltages actually applied to different columns of touch electrode blocks may cause a high capacitance value in the periphery of the panel and poor uniformity of capacitance value in the panel.

Accordingly, the present disclosure, inter alia, provides a voltage control circuit, a panel including the voltage control circuit, a display apparatus including the panel, and a voltage control method that substantially obviate one or more of the problems due to limitations and disadvantages of the related art.

Figure 1:
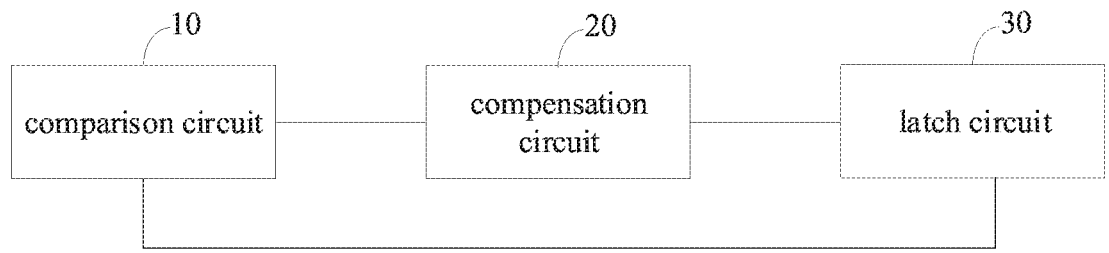
FIG. 1 is a block diagram of a voltage control circuit according to an embodiment of the present disclosure.

FIG. 1 is a block diagram of a voltage control circuit according to an embodiment of the present disclosure. As shown in FIG. 1, the voltage control circuit provided by the embodiment of the present disclosure includes: a comparison circuit 10, a compensation circuit 20 and a latch circuit 30.

According to the embodiment of the present disclosure, the comparison circuit 10 is configured to compare a first voltage with a second voltage, output a first signal in a case where a difference between the first voltage and the second voltage exceeds a thresholds range, and output a second signal in a case where the difference between the first voltage and the second voltage is within the thresholds range. Optionally, the second voltage is a reference voltage.

In some embodiments, the comparison circuit 10 includes a first input terminal configured to input the first voltage and a second input terminal configured to input the second voltage (reference voltage).

According to an embodiment of the present disclosure, the compensation circuit 20 is coupled to the comparison circuit 10 and configured to compensate the first voltage in response to the first signal output by the comparison circuit 10.

Specifically, the compensation circuit 20 compensates the first voltage in the case where the difference between the first voltage and the reference voltage exceeds the thresholds range; the comparison circuit 20 determines whether the difference between the compensated first voltage and the reference voltage is in the thresholds range; in the case where the difference between the compensated first voltage and the reference voltage exceeds the thresholds range, the compensation circuit 20 re-compensates the first voltage, and the comparison circuit and the compensation circuit work repeatedly until the difference between the compensated first voltage and the reference voltage is within the thresholds range. For example, the thresholds range may be set as practically required.

According to an embodiment of the present disclosure, the latch circuit 30 is coupled to the comparison circuit 10 and the compensation circuit 20, and is configured to latch the first voltage in response to the second signal output from the comparison circuit 10.

The voltage control circuit provided by the embodiment of the present disclosure includes: a comparison circuit configured to compare a first voltage with a reference voltage, output a first signal in a case where a difference between the first voltage and the reference voltage exceeds a thresholds range, and output a second signal in a case where the difference between the first voltage and the reference voltage is within the thresholds range; a compensation circuit coupled to the comparison circuit, and configured to compensate the first voltage in response to the first signal output by the comparison circuit; a latch circuit, coupled to the comparison circuit and the compensation circuit, and configured to latch the first voltage in response to the second signal output by the comparison circuit. In the embodiment of the present disclosure, by controlling and compensating the input voltage (first voltage) of the voltage control circuit, the voltage control circuit outputs a voltage substantially equal to the reference voltage, thereby ensuring consistence between the actual signal received by the target component and the input signal by compensating the actual signal received by the target component.

Figure 2:
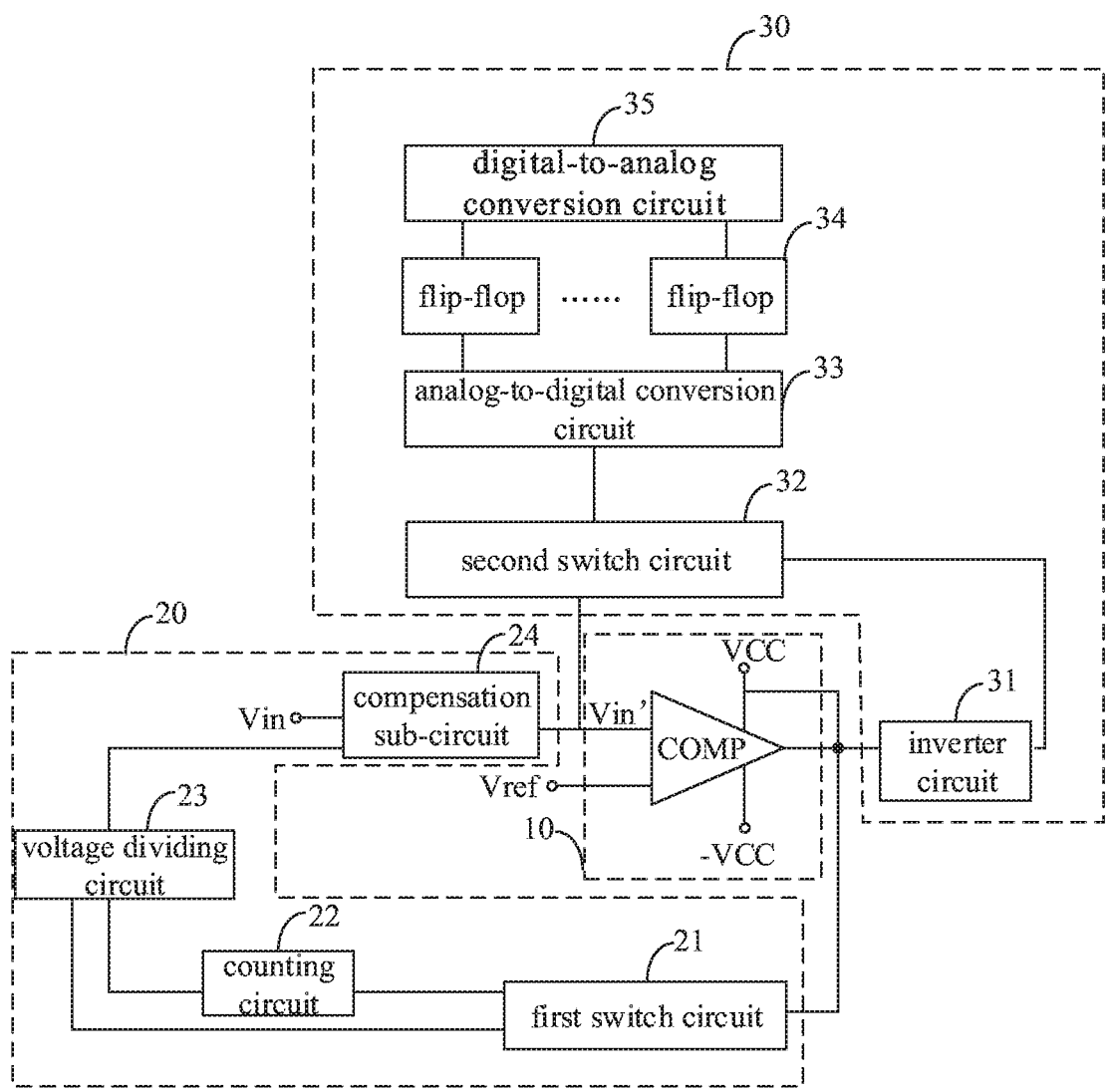
FIG. 2 is a schematic structural diagram of a voltage control circuit according to an embodiment of the present disclosure.
Figure 3:
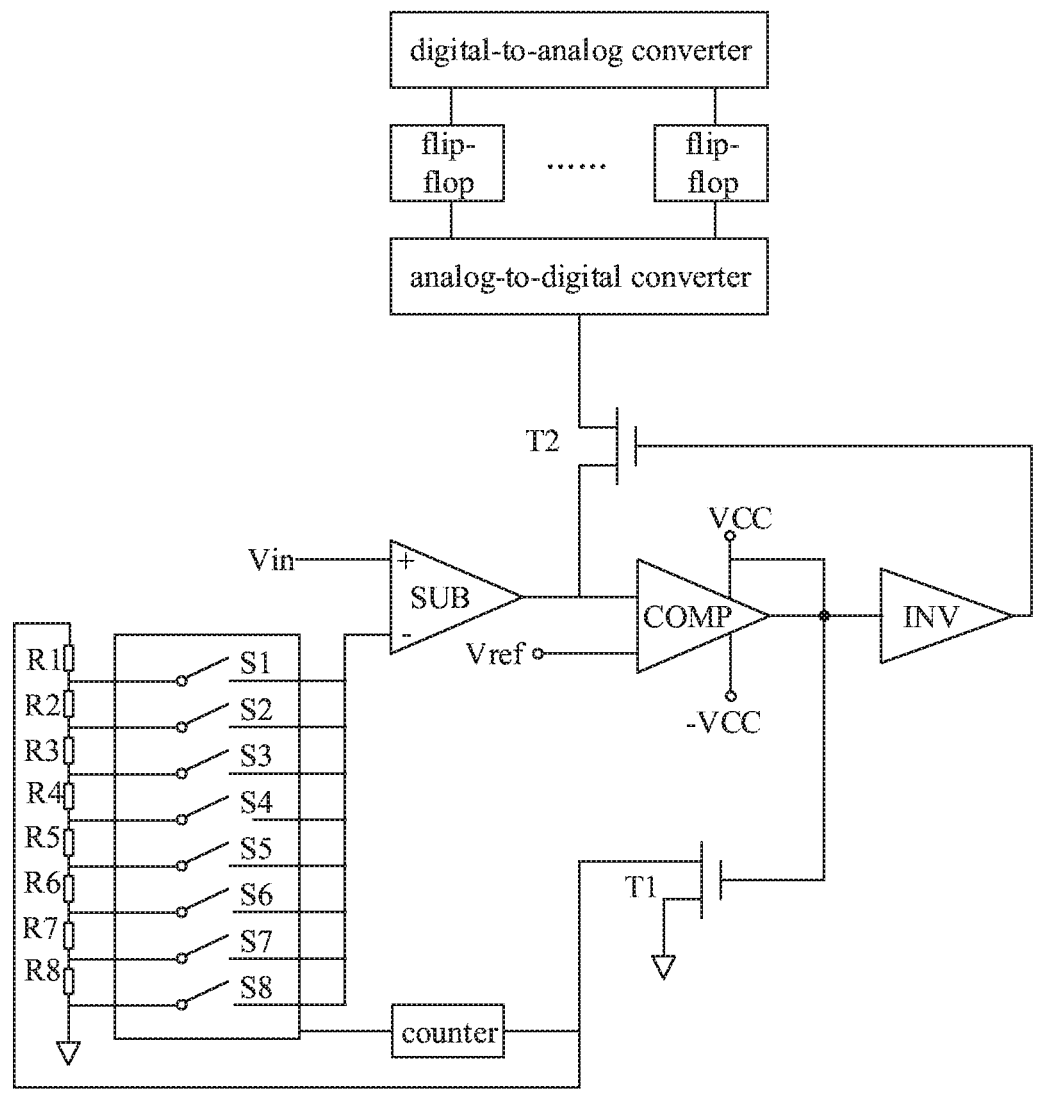
FIG. 3 is an equivalent circuit diagram of a voltage control circuit according to an embodiment of the present disclosure.

FIG. 2 is a schematic structural diagram of a voltage control circuit according to an embodiment of the present disclosure, and FIG. 3 is an equivalent circuit diagram of a voltage control circuit according to an embodiment of the present disclosure. Exemplary structures of a comparison circuit, a compensation circuit, and a latch circuit are specifically illustrated in FIGS. 2 and 3. Those skilled in the art will readily appreciate that the implementation of the above circuits is not limited thereto as long as their respective functions can be realized.

In some embodiments, the comparison circuit 10 includes a comparator (COMP). Optionally, a first input terminal of the comparison circuit 10 is a positive input terminal of the comparator, and a second input terminal of the comparison circuit 10 is a negative input terminal of the comparator. As shown in FIG. 2 and FIG. 3, an input terminal of the compensation circuit 20 is coupled to an output terminal of the comparison circuit 10, and an output terminal of the compensation circuit 20 is coupled to the first input terminal of the comparison circuit 10 (the positive input terminal of the comparator); the latch circuit 30 includes a third input terminal coupled to the first input terminal of the comparison circuit 10 (the positive input terminal of the comparator) and a fourth input terminal coupled to the output terminal of the comparison circuit 20; the second input terminal of the comparison circuit 10 (the negative input terminal of the comparator) inputs a reference voltage Vref.

Optionally, in the case where the difference between the reference voltage and the first voltage exceeds the thresholds range, the comparator outputs a high-level signal as the first signal, and in the case where the difference between the reference voltage and the first voltage is within the thresholds range, the comparator outputs a low-level signal as the second signal.

It should be noted that the specific value of the operating voltage VCC of the comparator is not limited in the present disclosure.

Optionally, the compensation circuit 20 includes a first switch circuit 21, a counting circuit 22, a voltage dividing circuit 23, and a compensation sub-circuit 24.

The first switch circuit 21 is respectively coupled to the output terminal of the comparator, the counting circuit 22 and the voltage dividing circuit 23, and is configured to trigger the counting circuit 22 to count the number of times of compensation in response to the first signal (for example, a high-level signal) output by the comparator.

Optionally, the first switch circuit 21 includes: a first switch transistor T1; a gate of the first switch transistor T1 is coupled to the output terminal of the comparator, and a first electrode of the first switch transistor T1 is coupled to the counting circuit and the voltage dividing circuit, and a second electrode of the first switch transistor T1 is grounded.

Optionally, the counting circuit 22 includes a counter.

In some embodiments, when a high-level signal is output from the output terminal of the comparator, the first switch circuit 21 is turned on, and a count value indicating the number of times of compensation in the counting circuit is incremented by one. It should be noted that an initial value of the count value indicating the number of times of compensation in the counting circuit is 0.

The voltage dividing circuit 23 is coupled to the counting circuit 22 and the compensation sub-circuit 24, and is configured to output a corresponding compensation voltage according to the number of times of compensation.

Optionally, the voltage dividing circuit 23 includes: a voltage divider.

In some embodiments, the voltage divider includes a plurality of resistors coupled in series, and a signal output terminal of each resistor is coupled to the first input terminal of the compensation circuit via a corresponding switch. FIG. 3 illustrates an example of eight resistors R1 to R8 and eight switches S1 to S8. The voltage divider is configured to turn on a corresponding switch according to the number of times of compensation and output a corresponding compensation voltage. It should be noted that different numbers of times of compensation correspond to different switches. For example, when the number of times of compensation is 1, a first switch S1 is turned on, and a first resistor R1 is coupled to the circuit; when the number of times of compensation is 2, the first switch S1 is turned off, a second switch S2 is turned on, the first resistor R1 and a second resistor R2 are coupled to the circuit, and so on.

The compensation sub-circuit 24 is coupled to the voltage dividing circuit 23, the positive input terminal of the comparator, and the input terminal of the latch circuit, respectively, and is configured to compensate the first voltage according to the compensation voltage output from the voltage dividing circuit 23.

In some embodiments, the compensation sub-circuit 24 includes a first input terminal coupled to the output terminal of the voltage dividing circuit 23 and a second input terminal configured to input the first voltage Vin, and the output terminal of the compensation sub-circuit 24 outputs the compensated first voltage Vin'.

Optionally, the compensation sub-circuit 24 includes: a subtractor (SUB).

In some embodiments, a positive input terminal of the subtractor inputs the first voltage Vin, a negative input terminal of the subtractor is coupled to the output terminal of the voltage divider, and the output terminal of the subtractor is coupled to the positive input terminal of the comparator.

Optionally, the latch circuit includes an inverter circuit 31, a second switch circuit 32, an analog-to-digital conversion circuit 33, a digital-to-analog conversion circuit 35, and a plurality of flip-flops 34.

The inverter circuit 31 is coupled to the output terminal of the comparator and the second switch circuit 32, and is configured to invert a signal output from the output terminal of the comparator.

Optionally, the inverter circuit 31 includes an inverter (INV). For example, if the output terminal of the comparator outputs a high-level signal, the inverter circuit 31 converts the high-level signal into a low-level signal, and if the output terminal of the comparator outputs a low-level signal, the inverter circuit 31 converts the low-level signal into a high-level signal.

The second switch circuit 32 is also coupled to the first input terminal of the comparison circuit 10 and the analog-to-digital conversion circuit 33, and is configured to provide the first voltage to the analog-to-digital conversion circuit 33 under the control of the signal output by the inverter circuit 31. The inverter circuit 31 controls the second switch circuit 32 to supply the first voltage to the analog-to-digital conversion circuit 33 in response to the second signal output from the comparison circuit 10.

Optionally, the second switch circuit 32 includes: a second switch transistor T2; a gate of the second switch transistor is coupled to the output terminal of the inverter circuit, a first electrode of the second switch transistor is coupled to the analog-to-digital conversion circuit 33, and a second electrode of the second switch transistor is coupled to the output terminal of the subtractor.

The analog-to-digital conversion circuit 33 is also coupled to the plurality of flip-flops 34 and is configured to perform analog-to-digital conversion on the first voltage supplied through the second switch circuit 32.

Optionally, the analog-to-digital conversion circuit 33 includes an analog-to-digital converter.

The plurality of flip-flops 34 are also coupled to the digital-to-analog conversion circuit 35 and are configured to latch the first voltage subjected to the analog-to-digital conversion.

The digital-to-analog conversion circuit 35 is configured to perform digital-to-analog conversion on the latched first voltage, and output the first voltage subjected to the digital-to-analog conversion as an output voltage of the voltage control circuit.

Optionally, the digital-to-analog conversion circuit 35 includes a digital-to-analog converter.

The working process of the voltage control circuit is further described below.

A reference voltage Vref and an input voltage of the voltage control circuit (i.e., a first voltage) are obtained, and the comparator determines whether a difference between the first voltage and the reference voltage is within a thresholds range. In the case where the difference between the first voltage and the reference voltage exceeds the thresholds range, the comparator outputs, for example, a high-level signal, so that the first switch transistor T1 is turned on, a count value in the counter is changed from 0 to 1, and the high-level signal is used as an enable signal of the voltage divider to control the first switch S1 to be turned on. At this moment, the circuit load only includes the first resistor R1, the first voltage is compensated by the subtractor to obtain the compensated first voltage Vin', and the comparator determines whether the difference between Vin' and the reference voltage is within the thresholds range. In the case where the difference between Vin' and the reference voltage exceeds the thresholds range, the comparator outputs a high-level signal, so that the first switch transistor T1 is turned on, the count value in the counter is changed from 1 to 2, the first switch S1 is controlled to be turned off, and the second switch S2 is controlled to be turned on. At this moment, the circuit load includes the first resistor R1 and the second resistor R2, and the first voltage is re-compensated by the subtractor to generate Vin'. The comparator re-compares Vin' with the reference voltage, the subtractor re-compensates the first voltage through the voltage divider, and the comparison circuit and the compensation circuit operate cyclically until the difference between the first voltage and the reference voltage is within the thresholds range. In addition, when the comparator outputs a high-level signal, the inverter outputs a low-level signal, which controls the second switch transistor T2 to be turned off. When the difference between the first voltage and the reference voltage is within the thresholds range, the comparator outputs a low-level signal, the low-level signal causes the first switch transistor T1 to be turned off, and the first voltage is no longer compensated; the inverter outputs a high-level signal, so that the second switch transistor T2 is turned on, and the analog-to-digital converter performs analog-to-digital conversion on the first voltage; the flip-flops perform latch processing on the first voltage subjected to the analog-to-digital conversion; the digital-to-analog converter performs digital-to-analog conversion on the latched first voltage, and outputs the first voltage subjected to the digital-to-analog conversion as an output voltage of the voltage control circuit.

Figure 4:
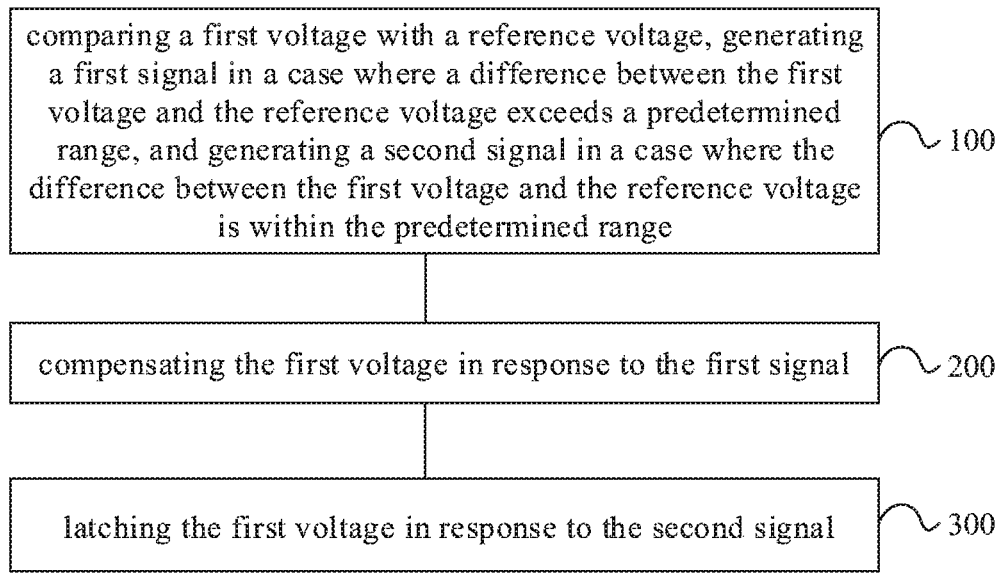
FIG. 4 is a flowchart of a voltage control method according to an embodiment of the present disclosure.

Based on the inventive concept of the above embodiments, an embodiment of the present disclosure further provides a voltage control method. FIG. 4 is a flowchart of a voltage control method according to an embodiment of the present disclosure. As shown in FIG. 4, the voltage control method according to the embodiment of the present disclosure can be applied to the voltage control circuit according to the foregoing embodiments, and specifically includes steps 100 to 300.

Step 100 includes comparing a first voltage with a reference voltage, generating a first signal in a case where a difference between the first voltage and the reference voltage exceeds a thresholds range, and generating a second signal in a case where the difference between the first voltage and the reference voltage is within the thresholds range.

Specifically, the first voltage is an input voltage of the voltage control circuit.

Step 200 includes compensating the first voltage in response to the first signal.

In some embodiments, step 200 includes: counting the number of times of compensation in response to the first signal; outputting a corresponding compensation voltage according to the number of times of compensation; and compensating the first voltage according to the compensation voltage.

Specifically, outputting the corresponding compensation voltage according to the number of times of compensation includes: controlling a corresponding switch to be turned on according to the number of times of compensation, to output the corresponding compensation voltage.

It should be noted that different numbers of times of compensation correspond to different switches, and different numbers of times of compensation correspond to different compensation voltages.

Step 300 includes latching the first voltage in response to the second signal.

In some embodiments, step 300 specifically includes: performing analog-to-digital conversion on the first voltage in response to the second signal; latching the first voltage subjected to the analog-to-digital conversion; performing digital-to-analog conversion on the latched first voltage, and outputting the first voltage subjected to the digital-to-analog conversion as an output voltage of the voltage control circuit.

In some embodiments, the voltage control method is used to sequentially control input charging voltages of a plurality of columns of electrodes. Optionally, the voltage control method includes: for each column of electrodes, repeatedly performing the comparing, compensating, and latching steps by taking an input charging voltage of the column of electrodes as the first voltage, until the first voltage is latched; and inputting the latched first voltage to the column of electrodes.

In some embodiments, the reference voltage is an input charging voltage of the K-th column of electrodes; K is a maximum integer that does not exceed N/2, that is $$K = \left[\frac{N}{2}\right],$$

where N is the number of columns of the plurality of columns of electrodes.

The voltage control method according to the embodiment of the present disclosure includes: comparing a first voltage with a reference voltage, generating a first signal in a case where a difference between the first voltage and the reference voltage exceeds a thresholds range, and generating a second signal in a case where the difference between the first voltage and the reference voltage is within the thresholds range; compensating the first voltage in response to the first signal; and latching the first voltage in response to the second signal. In the embodiments of the present disclosure, the input voltage of the voltage control circuit is controlled and compensated so that the voltage control circuit outputs a voltage substantially equal to the reference voltage, thereby controlling and compensating the actual signal received by the target component to ensure that the actual signal received by the target component is consistent with the input signal.

Based on the inventive concepts of the above embodiments, an embodiment of the present disclosure provides a panel including: N columns of electrodes, and a voltage control circuit according to the embodiments of the present disclosure.

Optionally, the voltage control circuit is coupled to a voltage input terminal of an i-th column of electrodes of the N columns of electrodes, where i is a positive integer, and i≤N.

The voltage control circuit in the embodiment of the present disclosure is the voltage control circuit provided in the foregoing embodiment, and for the implementation and effect thereof, the above description may be referred to, and details are not described herein again.

It should be noted that the panel may include: a touch panel or a display panel. The voltage control circuit according to the embodiment of the present disclosure may be used to control a voltage of a touch electrode in the touch panel, and may also be used to control a voltage of a pixel electrode in the display panel, which is not limited in the present disclosure.

Hereinafter, the technical solution of the embodiment of the present disclosure will be described by taking a case of controlling the voltage of the touch electrode in the touch panel as an example. The electrode in the embodiment refers to the touch electrode in the touch panel.

Optionally, the reference voltage is an input charging voltage of a K-th column of electrodes, where $$K = \left[\frac{N}{2}\right].$$

In a case where N is an even number, $$K = \frac{N}{2},$$

in a case where N is an odd number, $$K = \frac{N+1}{2}.$$

That is, the reference voltage is an input charging voltage of a middle column of touch electrodes in the touch panel.

The voltage control circuit can make the input charging voltage of the i-th column of touch electrodes substantially equal to the reference voltage. When the voltage control circuit is coupled to each column of touch electrodes, the voltage values of all columns of touch electrodes are substantially equal to the reference voltage. Thus, the amount of charges stored in each column of touch electrodes is substantially the same, which ensures the uniformity of the overall capacitance of the touch panel and improves product yield.

The technical solution of the embodiment of the present disclosure is further described by taking one column of touch electrodes in the touch panel as an example.

The input charging voltage of the middle column of touch electrodes in the touch panel is selected as the reference voltage Vref, and the initial voltage of the i-th column of touch electrodes is used as the first voltage Vin. The comparator determines whether the difference between the first voltage and the reference voltage is within the thresholds range. In the case where the difference between the first voltage and the reference voltage exceeds the thresholds range, the comparator outputs a high-level signal, so that the first switch transistor T1 is turned on, and the counter value of the counter is changed from 0 to 1, and the first switch S1 is controlled to be turned on. At this moment, the circuit load only includes the first resistor R1, and the first voltage is compensated by the subtractor to obtain the compensated first voltage Vin'. The comparator determines whether the difference between Vin' and the reference voltage is within the thresholds range. In the case where the difference between Vin' and the reference voltage exceeds the thresholds range, the comparator outputs a high-level signal, so that the first switch transistor T1 is turned on, the counter value of the counter is changed from 1 to 2, the first switch S1 is controlled to be turned off, and the second switch S2 is controlled to be turned on. At this moment, the circuit load includes the first resistor R1 and the second resistor R2, and the first voltage is re-compensated by the subtractor to generate Vin'. The comparator re-compares Vin' and the reference voltage, the first voltage is re-compensated through the voltage divider, and the comparison circuit and the compensation circuit operate cyclically until the difference between the first voltage and the reference voltage is within the thresholds range. In addition, when the comparator outputs a high-level signal, the inverter outputs a low-level signal, which controls the second switch transistor T2 to be turned off. When the second voltage is generated, the comparator outputs a low-level signal, the low-level signal causes the first switch transistor T1 to be turned off, the first voltage is no longer compensated, the inverter outputs a high-level signal, the second switch transistor T2 is turned on, and the analog-to-digital converter performs analog-to-digital conversion on the first voltage; the flip-flops latch the first voltage subjected to the analog-to-digital conversion; the digital-to-analog converter performs digital-to-analog conversion on the latched first voltage, and input the first voltage subjected to the digital-to-analog conversion to the i-th column of touch electrodes as the input charging voltage of the i-th column of touch electrodes. The voltage control circuit compares and compensates all columns of touch electrodes on the touch panel column by column, latches the adjusted input charging voltage for each column, and inputs the latched input charging voltage for each column to each column of touch electrodes. Thereby, the amount of charges stored in each column of touch electrodes is substantially the same.

Based on the inventive concepts of the foregoing embodiments, an embodiment of the present disclosure provides a display apparatus, including: a panel.

The panel of the display apparatus in the embodiment of the present disclosure is the panel according to the embodiment of the present disclosure, and for the implementation and effect thereof, the above description can be referred to, and details thereof are not described herein again.

It should be noted that the drawings of the embodiments of the present disclosure relate only to the structures involved in the embodiments of the present disclosure, and other structures may refer to the general design. In the case of no conflict, the embodiments of the present disclosure and the features in the embodiments, may be combined with each other to obtain a new embodiment.

The embodiments disclosed in the present disclosure are as described above, but are merely used to facilitate the understanding of the present disclosure, and are not intended to limit the present disclosure. Any modification and variation in the form and details of the implementation may be made by those skilled in the art without departing from the spirit and scope of the disclosure, but the scope of the invention is to be determined by the scope of the appended claims.

The invention claimed is:

1. A voltage control circuit, comprising:
a comparison circuit, configured to compare a first voltage with a second voltage, output a first signal in a case where a difference between the first voltage and the second voltage exceeds a thresholds range, and output a second signal in a case where the difference between the first voltage and the second voltage is within the thresholds range;
a compensation circuit, coupled to the comparison circuit, and configured to compensate the first voltage in response to the first signal output by the comparison circuit, wherein the comparison circuit comprises a first input terminal configured to input the first voltage and a second input terminal configured to input the second voltage; an input terminal of the compensation circuit is coupled to an output terminal of the comparison circuit, and an output terminal of the compensation circuit is coupled to the first input terminal; and
a latch circuit, coupled to the comparison circuit and the compensation circuit, and configured to latch the first voltage in response to the second signal output by the comparison circuit, wherein the latch circuit comprises a third input terminal coupled to the first input terminal and a fourth input terminal coupled to the output terminal of the comparison circuit,
wherein the compensation circuit comprises a first switch circuit and a compensation component; the first switch circuit is coupled to the output terminal of the comparison circuit and configured to trigger the compensation component to compensate the first voltage in response to the first signal output by the comparison circuit,
the first switch circuit comprises a first switch transistor, a control electrode of the first switch transistor is coupled to the output terminal of the comparison circuit, a first electrode of the first switch transistor is coupled to the compensation component, and a second electrode of the first switch transistor is grounded, and
the compensation component comprises a counting circuit, a voltage dividing circuit and a compensation sub-circuit; the counting circuit is coupled to the first switch circuit, and the first switch circuit is configured to trigger the counting circuit to count a number of times of compensation in response to the first signal output by the comparison circuit; the voltage dividing circuit is coupled to the counting circuit, and configured to output a corresponding compensation voltage according to the number of times of compensation; and the compensation sub-circuit is respectively coupled to an output terminal of the voltage dividing circuit, the first input terminal of the comparison circuit, and the third input terminal of the latch circuit, and configured to compensate the first voltage based on the compensation voltage output by the voltage dividing circuit.

2. The voltage control circuit of claim 1, wherein the comparison circuit comprises a comparator.

3. The voltage control circuit of claim 1, wherein the compensation sub-circuit comprises a subtractor;

a positive input terminal of the subtractor is configured to input the first voltage, a negative input terminal of the subtractor is coupled to the output terminal of the voltage dividing circuit, and an output terminal of the subtractor is coupled to the first input terminal of the comparison circuit and third input terminal of the latch circuit.

4. The voltage control circuit of claim 1, wherein the voltage dividing circuit comprises a voltage divider; the voltage divider comprises a plurality of switches, and is configured to turn on a corresponding one of the plurality of switches according to the number of times of compensation, and output a corresponding compensation voltage.

5. The voltage control circuit of claim 3, wherein the latch circuit comprises: an inverter circuit, a second switch circuit, and a latch sub-circuit;
the inverter circuit is coupled to the output terminal of the comparison circuit and the second switch circuit, and is configured to invert a signal output from the output terminal of the comparison circuit;
the second switch circuit is further coupled to the first input terminal of the comparison circuit and the latch sub-circuit, and the inverter circuit is configured to control the second switch circuit to provide the first voltage to the latch sub-circuit in response to the second signal output by the comparison circuit; and
the latch sub-circuit is configured to latch the first voltage provided through the second switch circuit.

6. The voltage control circuit of claim 5, wherein the second switch circuit comprises a second switch transistor; a control electrode of the second switch transistor is coupled to an output terminal of the inverter circuit, a first electrode of the second switch transistor is coupled to the latch sub-circuit, and a second electrode of the second switch transistor is coupled to the first input terminal of the comparison circuit.

7. The voltage control circuit of claim 6, wherein the latch sub-circuit comprises: an analog-to-digital conversion circuit, a digital-to-analog conversion circuit, and a plurality of flip-flops;
the second switch circuit is coupled to the analog-to-digital conversion circuit;
the analog-to-digital conversion circuit is further coupled to the plurality of flip-flops and configured to perform analog-to-digital conversion on the first voltage provided through the second switch circuit;
the plurality of flip-flops are further coupled to the digital-to-analog conversion circuit, and configured to latch the first voltage subjected to the analog-to-digital conversion; and
the digital-to-analog conversion circuit is configured to perform digital-to-analog conversion on the latched first voltage, and output the first voltage subjected to the digital-to-analog conversion.

8. A panel, comprising: N columns of electrodes and the voltage control circuit of claim 1,
wherein the voltage control circuit is coupled to a voltage input terminal of an i-th column of electrodes of the N columns of electrodes, where i is a positive integer, and i≤N.

9. The panel of claim 8, wherein the electrode is one of a touch electrode and a pixel electrode.

10. The panel of claim 8, wherein the second voltage is an input charging voltage of a K-th column of electrodes; and $$K = \left[\frac{N}{2}\right].$$

11. A display apparatus, comprising the panel of claim 8.

12. A voltage control method, comprising:
comparing a first voltage with a reference voltage,
generating a first signal in a case where a difference between the first voltage and the reference voltage exceeds a thresholds range, and generating a second signal in a case where the difference between the first voltage and the reference voltage is within the thresholds range;
compensating the first voltage in response to the first signal; and
latching the first voltage in response to the second signal, wherein the voltage control method is used for sequentially controlling input charging voltages of a plurality of columns of electrodes,
the voltage control method comprises: for each column of electrodes among the plurality of columns of electrodes, repeating the comparing, compensating and latching steps by taking the input charging voltage of the column of electrodes as the first voltage, until the first voltage is latched; and inputting the latched first voltage to the column of electrodes, and
the reference voltage is an input charging voltage of a K-th column of electrodes;

$$K = \left[\frac{N}{2}\right],$$

where N is a number of columns of the plurality of columns of electrodes.

13. The voltage control method of claim 12, wherein compensating the first voltage in response to the first signal comprises:
counting a number of times of compensation in response to the first signal;
outputting a corresponding compensation voltage according to the number of times of compensation; and
compensating the first voltage according to the compensation voltage.

14. The voltage control method of claim 12, wherein latching the first voltage in response to the second signal comprises:
performing analog-to-digital conversion on the first voltage in response to the second signal;
latching the first voltage subjected to the analog-to-digital conversion, and
performing digital-to-analog conversion on the latched first voltage and outputting the first voltage subjected to the digital-to-analog conversion.

* * * * *